United States Patent [19]

Ishii

[11] 4,110,866
[45] Sep. 5, 1978

[54] CASTER EQUIPPED WITH A STOPPER

[75] Inventor: Hiroyuki Ishii, Tokyo, Japan

[73] Assignee: Sugatsune Industrial Co., Ltd., Tokyo, Japan

[21] Appl. No.: 856,185

[22] Filed: Nov. 30, 1977

[51] Int. Cl.² .................................................. B60B 33/00
[52] U.S. Cl. ...................................... 16/35 R; 188/1 D
[58] Field of Search .................. 16/18 R, 45, 35 R; 211/74; 188/1 D, 69, 31

[56] References Cited

U.S. PATENT DOCUMENTS

| | | | |
|---|---|---|---|
| 1,671,774 | 5/1928 | McIntosh | 188/1 D |
| 2,987,141 | 6/1961 | Brooks | 16/35 |
| 2,996,154 | 8/1961 | Vial | 188/31 X |
| 3,002,589 | 10/1961 | Cook | 188/69 |
| 3,031,037 | 4/1962 | Stollman | 188/69 X |

FOREIGN PATENT DOCUMENTS

| | | | |
|---|---|---|---|
| 2,547,381 | 1977 | Fed. Rep. of Germany | 188/1 D |
| 1,353,192 | 1974 | United Kingdom | 188/1 D |

Primary Examiner—Ronald Feldbaum
Attorney, Agent, or Firm—George B. Oujevolk

[57] ABSTRACT

A caster equipped with a stopper for use in a wagon, a chair or the like, comprising a proper whose shell is formed into a substantially circular arc and which supports wheels through an axle, a stopper piece which is provided at an inner end of the proper and which freely contacts with parts of the wheels so as to lock or unlock the wheels, a lock pin which protrudes from a window provided in the proper, a compression spring which is interposed between the stopper piece and boss portions of the proper and whose elasticity acts on the lock pin as an unlocking force, a control piece which is provided with a lock hole for snugly and slidably inserting the lock pin therein, which is mounted at a desired inclination angle relative to the lock pin and whose base end is fixed to the proper, and a release pin which protrudes from a window provided in the proper and which, when pushed inwards, depresses a free end of the control piece.

2 Claims, 4 Drawing Figures

CASTER EQUIPPED WITH A STOPPER

BACKGROUND OF THE INVENTION

This invention relates to a caster, and more particularly to a caster equipped with a stopper.

At the leg part of a wagon, a chair or the like, a caster is attached so that the movement may be easily and freely carried out. In order to keep the wagon, the chair or the like stationary at a predetermined position as may be needed, the caster is sometimes equipped with a stopper.

SUMMARY OF THE INVENTION

An object of this invention is to provide a caster in which the locking and unlocking of wheels can be simply and reliably executed by applying the principle of a universal hook.

According to one aspect of performance of this invention, there is provided a caster equipped with a stopper wherein the proper or main body of the caster has its shell formed into a substantially circular arc and supports wheels through an axle, the stopper additionally provided at an inner end of the proper can freely contact with parts of the wheels so as to lock rotation of the wheels or to release the locking, a lock pin on which an elasticity of a compression spring interposed between the stopper and boss portions of the proper is bestowed as an unlocking force is mounted in a manner to protrude from a window, and a control piece which is provided with a lock hole for snugly and slidably inserting the lock pin therein is mounted at a desired inclination angle with respect to the lock pin, with its base end fixed to the proper and with its free end made depressible by a "push-in" operation of a release pin protruding from a window in the proper.

BRIEF DESCRIPTION OF THE DRAWINGS

In the accompanying drawings.

DETAILED DESCRIPTION OF THE INVENTION

Figure 1:
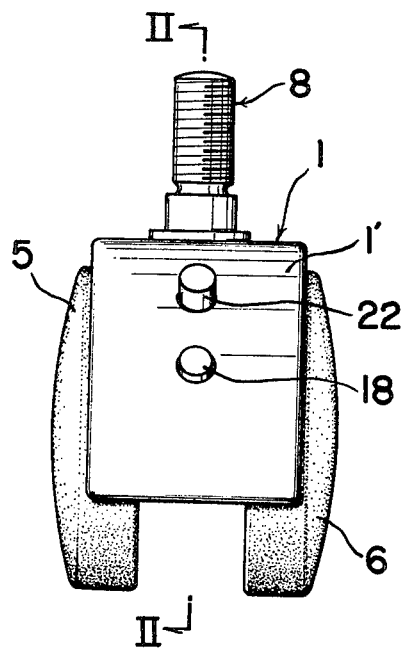
FIG. 1 is a front view of a caster equipped with a stopper according to this invention.

Numeral 1 designates the main body or proper of a caster, a shell 1' of which is formed into a substantially circular arc. At the central position and one side end part of the caster, boss portions 2 and 3 are respectively disposed at right angles to each other and integrally with the proper 1.

In one boss portion 2, an axle 4 is penetratingly fixed. Wheels 5 and 6 are rotatably journaled in bearings at protrusive ends of the axle 4 on both the sides thereof, respectively. In the other boss portion 3, a bush 7 is inserted. A mounting shaft 8 for the caster is rotatably fitted and supported through a washer 9. The caster is mounted on the leg part of a wagon, a chair or the like by the mounting shaft 8.

The outer peripheries of boss portions 10 and 11 of the wheels 5 and 6 snugly fitted on the axle 4 are respectively formed with gear portions 12 and 13 which can disengageably mesh with a stopper to be described later.

The proper 1 has a partition plate 14 which is extended and formed towards the center of the interior of the proper from the central part of the inner surface of the circular arc portion 1' forming the shell and which partitions the interior of the proper 1 into front and rear parts. The partition plate 14 is provided continuously to the boss portions 2 and 3. It is formed with an arcuate window 15 along the inner surface of the circular arc portion 1'. Arranged in the arcuate window 15 is a control piece, such as leaf spring, 16 whose base end 16' is snugly engaged and fixed in a groove 17 provided in the partition plate 14 and whose other end is made a free end 16". A release pin 18 which is planted in the free end 16" is snugly and slidably inserted in a window 19 provided in the circular arc portion 1' of the proper 1, and it is caused to project to the exterior. In addition, the control piece 16 is provided with a lock hole 20 in which a lock pin to be described below is snugly and slidably inserted.

The lock pin 22 with the stopper 21 attached to the inner end thereof is arranged in the proper 1 in such a manner that the stopper 21 contacts with the boss portions 10, 11 of the wheels 5, 6 substantially at right angles thereto, that the lock pin 22 is snugly inserted in the lock hole 20 and a window 23 provided in the circular arc portion 1' of the proper 1, and that the lock pin 22 is axially slidable with its outer end part protruding to the exterior. A compression spring 24 is interposed between the stopper 21 and the boss portion 2 of the proper 1, and its elasticity functions as an unlocking force.

The inner end of the stopper 21 is formed into a meshing portion 25 which can mesh with the gear portions 12 and 13. The rotation of the wheels 5, 6 is locked by bringing the meshing portion 25 and the gear portions 12, 13 into mesh engagement by means of the lock pin 22 snugly supported in the window 23 of the proper 1.

The control piece 16 with the lock pin 22 snugly inserted in the lock hole 20 thereof is secured to the proper 1 at a desired inclination angle with respect to the axis of the lock pin 22 as described above. The lock hole 20 and the lock pin 22 have their respective inside diameter and outside diameter set in advance so that the lock pin 22 may be slidable relative to the lock hole 20 when the control piece 16 and the lock pin 22 are held substantially orthogonal. The lock pin 22 is snugly engaged and held in the lock hole 20 owing to the principle of a universal hook which is based on the fact that the elasticity of the compression spring 24 pushes and urges the lock pin 22 outwards as the so-called unlocking force for separating the stopper 21 from the gear portions 12, 13 of the wheels 5, 6.

Figure 2:
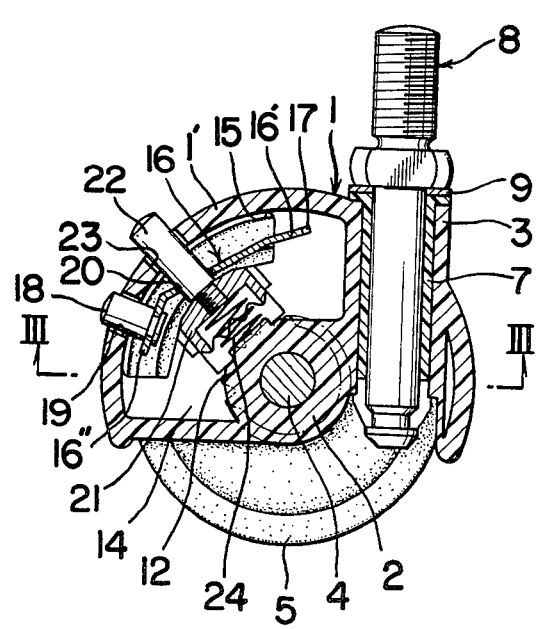
FIG. 2 is a vertical sectional side view of the caster taken along line II — II in FIG. 1.
Figure 3:
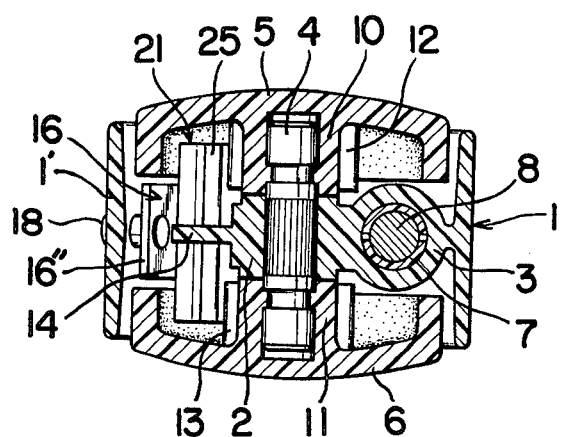
FIG. 3 is a cross-sectional view of the caster taken along line III — III in FIG. 2.
Figure 4:
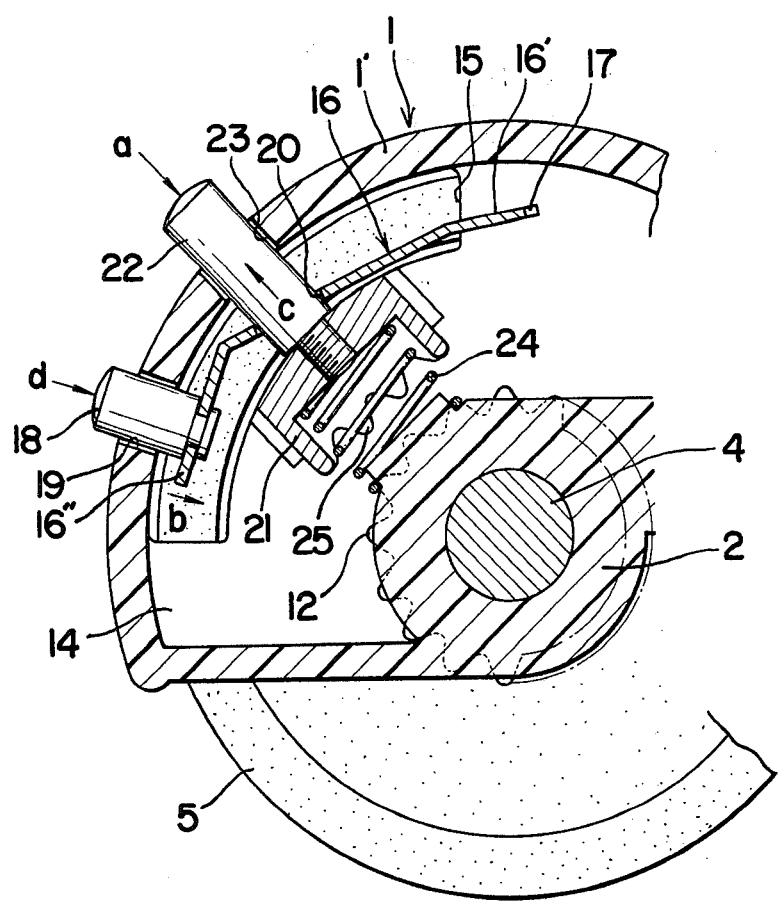
FIG. 4 is an enlarged vertical sectional side view showing the stopper of the caster.

In the above construction, while the lock pin 22 is pushed to the exterior by the elasticity of the compression spring 24 as shown in FIGS. 2 and 4, the meshing portion 25 of the stopper 21 is held at a position spaced from the gear portions 12, 13 of the wheels 5, 6, so that the wheels 5, 6 can rotate freely. That is, the unlocked state is established.

When the lock pin 22 is subjected to a "push-in" operation in the direction of arrow $a$ from the illustrated position, it is pushed in along with the stopper 21 against the resilience of the compression spring 24 and while compressing the compression spring 24. Consequently, the meshing portion 25 of the stopper 21 is caused to mesh with the gear portions 12, 13 of the wheels 5, 6.

In such a push-in operation of the lock pin 22, the control piece, such as leaf spring, 16 which holds the lock pin 22 in frictional engagement with the lock hole 20 has the side of the free end 16" pushed and displaced slightly in the direction of arrow *b* in FIG. 4 against the elasticity of the leaf spring itself, by the lock pin 22 and through a frictional force and with the base end 16' being made a swinging fulcrum. Thus, the push-in operation of the lock pin 22 is enabled, and the lock pin 22 is pushed in as described above.

The push-in operation terminates at the "push-in" end of the lock pin 22 at which the meshing portion 25 meshes with the gear portions 12, 13. Simultaneously with the termination, the elasticity of the compression spring 24 acts in the direction of pushing out the lock pin 22, i.e., in the direction of arrow *c* in FIG. 4. Therefore, the lock pin 22 is engaged in the lock hole 20 of the leaf spring 16 owing to the principle of the universal hook. Thus, the wheels 5 and 6 are held locked.

When, at the lock position as described above, the release pin 18 is subjected to a "push-in" operation in the direction of arrow *d* in FIG. 4, the free end 16" of the control piece 16 is pushed in the direction of arrow *b*, whereby the control piece 16 is displaced to the position being substantially orthogonal to the lock pin 22, with the base end 16' being made a swinging fulcrum. Accordingly, the lock pin 22 is disengaged from the lock hole 20. Therefore, the lock pin 22 is pushed out by the compression spring 24, the meshing portion 25 of the stopper 21 has the mesh engagement with the gear portions 12, 13 of the wheels 5, 6 released, and the restraint of the wheels 5, 6 is released.

In this manner, the locking and unlocking of the wheels 5, 6 are respectively done by the push-in operation of the lock pin 22 and the push-in operation of the release pin 18. These operations can be simply performed by, for example, one foot.

In the foregoing embodiment, the gear portions 12, 13 are provided at the outer peripheries of the boss portions 10, 11 of the wheels 5, 6, the meshing portion 25 is provided in the stopper 21 so as to mesh therewith, and the function of the stopper is achieved in the state in which they are caused to mesh with each other. This invention, however, is not restricted to the embodiment. By way of example, in order to achieve the function of the stopper in such a manner that the stopper 21 comes into frictional contact with the outer peripheries of the boss portions 10, 11 of the wheels 5, 6, a friction plate made of rubber or the like may be interposed between the boss portions and the stopper. With such a construction, the same object and functional effect as in the foregoing embodiment can be accomplished.

When, instead of the leaf spring, a rigid plate is used as the control piece 16, the base end of the rigid plate is pivotally mounted on the proper 1 and the rigid plate is held in a state inclining relative to the lock pin 22, and a spring is provided so that the free end 16" of the *c* control piece 16 may be urged upwards so as to permit the snug engagement of the lock pin. In addition, the illustrated release pin 18 need not be snugly engaged with and fixed to the control piece 16, but it may merely directly or indirectly abut on the control piece so as not to get out of the window 19. Such constructions do not depart from the technical idea of this invention.

As set forth above, in accordance with the stopper of the caster of this invention, owing to the application of the principle of the universal hook, the locking and unlocking of the wheels 5, 6 can be reliably done by the very simple construction. Further, the locking or unlocking can be simply and easily done by only the push operation of the lock pin 22 or release pin 18. Moreover, since the lock pin 22 and the release pin 18 are arranged in the manner to protrude from the windows 23 and 19 of the proper 1 respectively, the locking or unlocking operation can be conveniently performed in a standing posture by the one-foot operation as the stopper of the caster which is mounted on the lower end of the leg part of a wagon, a chair or the like.

What is claimed is:

1. A caster equipped with a stopper, comprising:
    a proper whose shell is formed into a substantially circular arc and which supports wheels through an axle,
    a stopper piece which is provided at an inner end of said proper and which freely contacts with parts of said wheels so as to lock rotation of said wheels and to release the locking,
    a lock pin which protrudes from a window provided in said proper,
    a compression spring which is retained between said stopper piece and boss portions of said proper and whose elasticity urges said lock pin as an unlocking force,
    a control piece which is provided with a lock hole for snugly and slidably inserting said lock pin therein, which is mounted at a desired inclination angle with respect to said lock pin and whose base end is fixed to said proper, and
    a release pin which protrudes from a window provided in said proper and which, when pushed inwards, depresses a free end of said control piece.

2. A caster equipped with a stopper as defined in claim 1, wherein said control piece is a leaf spring.

* * * * *